(12) United States Patent
Hu et al.

(10) Patent No.: US 9,274,257 B2
(45) Date of Patent: Mar. 1, 2016

(54) LIGHT REFLECTIVE FILM AND METHOD FOR MANUFACTURING THE SAME

(71) Applicant: HON HAI PRECISION INDUSTRY CO., LTD., New Taipei (TW)

(72) Inventors: Chau-Jin Hu, New Taipei (TW); Feng-Yuen Dai, New Taipei (TW); Kun-Chan Wu, New Taipei (TW); Jia-Ming Wang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 85 days.

(21) Appl. No.: 14/219,021

(22) Filed: Mar. 19, 2014

(65) Prior Publication Data

US 2015/0185372 A1    Jul. 2, 2015

(30) Foreign Application Priority Data

Dec. 27, 2013  (TW) .............................. 102148680 A

(51) Int. Cl.
*G02B 5/08* (2006.01)
*G02B 1/12* (2006.01)
*B05D 3/02* (2006.01)
*C09D 5/33* (2006.01)
*C09D 7/12* (2006.01)

(52) U.S. Cl.
CPC .............. *G02B 5/0866* (2013.01); *C09D 5/004* (2013.01); *C09D 7/1275* (2013.01); *G02B 1/12* (2013.01); *Y10T 428/25* (2015.01); *Y10T 428/256* (2015.01); *Y10T 428/258* (2015.01); *Y10T 428/269* (2015.01); *Y10T 428/31681* (2015.04); *Y10T 428/31786* (2015.04)

(58) Field of Classification Search
CPC ........ G02B 5/0866; G02B 1/12; C09D 5/004; C09D 7/1275; Y10T 428/25; Y10T 428/256; Y10T 428/258; Y10T 428/269; Y10T 428/31605; Y10T 428/31609; Y10T 428/31681; Y10T 428/31786; C08K 3/0033; C08K 3/0041; B05D 2202/00; B05D 2401/00; B05D 2503/00
USPC ............... 428/425.8, 425.9; 427/372.2, 393.5
See application file for complete search history.

(56) References Cited

U.S. PATENT DOCUMENTS 6,096,835 A * 8/2000 Vandevoorde et al. .. 525/440.08
2003/0190434 A1* 10/2003 Byers et al. ................... 427/428
2005/0244584 A1* 11/2005 Afshar ........................ 427/407.1

FOREIGN PATENT DOCUMENTS

JP    06228462 A  *  8/1994

* cited by examiner

*Primary Examiner* — Thao T Tran
(74) *Attorney, Agent, or Firm* — Novak Druce Connolly Bove + Quigg LLP

(57) ABSTRACT

An exemplary light reflective film painted on a smooth reflective surface of a base includes a composition. The composition consists of polyester polyols, isocyanate, N-butyl acetate and light reflective powders. A mass of the polyester polyols and isocyanate is 15%-30% of the total mass of the composition, a mass of the N-butyl acetate is 50% of the total mass of the composition, and a mass of the light reflective powders is 20%-35% of the total mass of the composition. A method for manufacturing the light reflective film is also provided.

13 Claims, 1 Drawing Sheet

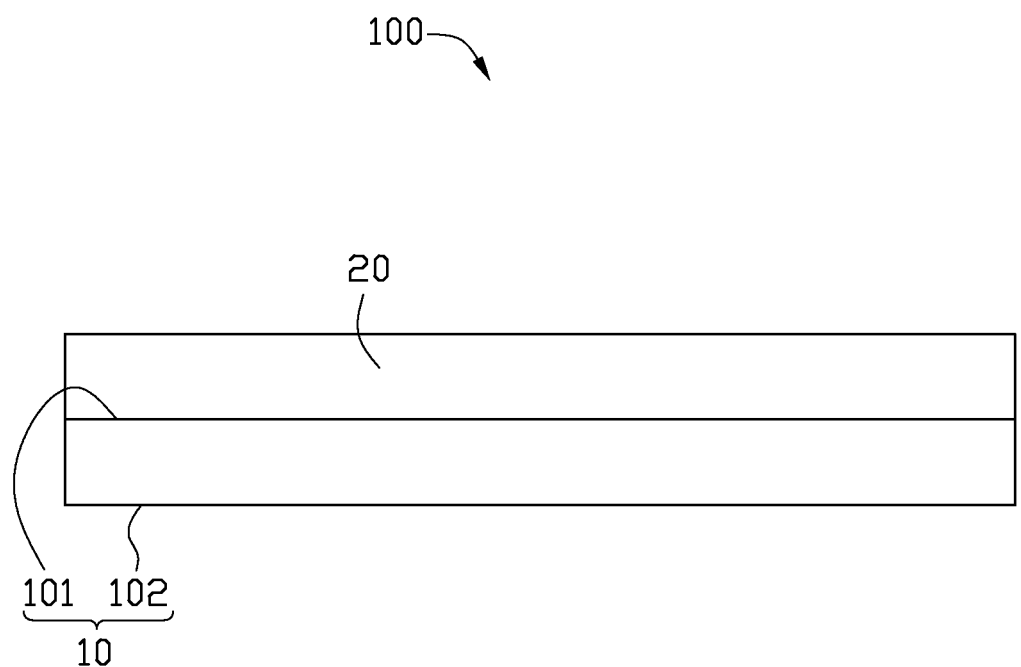

LIGHT REFLECTIVE FILM AND METHOD FOR MANUFACTURING THE SAME

BACKGROUND

1. Technical Field

This disclosure generally relates to light reflective elements, and particularly to a light reflective film and a method for manufacturing the light reflective film.

2. Description of Related Art

A typical backlight module includes a metal substrate with a smooth light reflective surface, light sources mounted on the substrate and a light diffuser over the light sources. Light emitted from the light sources is reflected by the smooth light reflective surface of the metal substrate to travels through the diffuser film to illuminate.

Conventionally, a light reflective film is further provided to be located on the smooth reflective surface of the metal substrate to increase the reflective efficiency of the metal substrate. However, because the reflective surface of the metal substrate is smooth, the light reflective film is not easy to be fixed to the smooth reflective surface of the metal substrate in a predetermined position and requirement, which affects the light efficiency of the backlight module.

What is needed, therefore, is a light reflective film and a method for manufacturing the light reflective film which can overcome the forgoing drawback.

BRIEF DESCRIPTION OF THE DRAWINGS

The FIGURE is a cross-sectional view of a light reflective film on a metal base according to an embodiment of the present disclosure.

DETAILED DESCRIPTION

Referring to the figure, an exemplary light reflective film 20 formed on a base 10 is provided.

The base 10 is a flat plate, and is made of a material with good light reflective efficiency, such as copper or aluminum.

The base 10 includes a flat and smooth upper surface 101 and a lower surface 102 opposite and parallel to the upper surface 101. In this embodiment, the upper surface 101 is the light reflective surface of the base 10.

The light reflective film 20 is formed on the upper surface 101 of the base 10, and covers the entire upper surface 101 of the base 10. Preferably, a thickness of the light reflective film 20 is 0.2 mm.

The light reflective film 20 is a composition consisting of polyester polyols, isocyanate, N-butyl acetate and light reflective powders. The light reflective film 20 is formed on the base 10 by a way of painting the composition on the upper surface 101 of the meta base 10. A mass ration among the polyester polyols and isocyanate, the N-butyl acetate, and the light reflective powders is 15%-30%: 50%: 20%-35%. A particle size of the light reflective powders is 0.2 um or 0.3 um. Preferably, the particle size of the light reflective powders is 0.2 um. In this embodiment, the light reflective powders are white reflective powders, such as barium sulfate powders or titanium dioxide powders. Preferably, the light reflective powders are titanium dioxide powders with a higher light reflecting efficiency.

The disclosure also relates to a method for manufacturing the light reflective film 20, and the method includes following steps:

S1: mixing the polyester polyols, the isocyanate, the N-butyl acetate, and the light reflective powders in a proportion to form a composition. In this embodiment, the a mass of the polyester polyols and isocyanate is 15%-30% of the total mass of the composition, a mass of the N-butyl acetate is 50% of the total mass of the composition, a mass of the light reflective powders is 20%-35% of the total mass of the composition.

Preferably, the mass of the polyester polyols and isocyanate is 15% of the total mass of the composition, and the mass of the light reflective powders is 35% of the total mass of the composition. A particle size of the light reflective powders is 0.2 um.

S2: providing a base 10, and uniformly painting the composition to cover the light reflective surface of the base 10. In this embodiment, the composition is painted on the upper surface 101 of the base 10. The base 10 may be a copper base, an aluminum base, or an iron base.

S3: heating the composition painted on the light reflective surface of the base 10 to hardening to attach to the light reflective surface of the base 10 to form the light reflective film 20. Preferably, a thickness of the light reflective film 20 is 0.2mm. In this embodiment, the composition painted on the light reflective surface of the base 10 can be heated by baked in a baking oven or by radiated via infrared rays.

In order to compare the light reflecting efficiency of the base 10 having the light reflective film 20 formed on the reflective surface of the base 10 with the conventional base 10, a testing method between the base 10 having the light reflective film 20 and the conventional base 10 is shown as follows:

Step 1: choosing a base 10 and testing the light reflecting efficiency of the base 10. In this process, the base 10 is an iron base, and the thickness of the base 10 is 0.2 mm. The light reflecting efficiency of the base 10 is 97.68%.

Step2: choosing light reflective powders whose particle size is 0.2 um as sample 1, choosing light reflective powders whose particle size is 0.3 um as sample 2, choosing light reflective powders whose particle size is 0.2 um and processed with a surface treatment as sample 3, and respectively mixing the sample 1, sample 2, and sample 3 with the polyester polyols, isocyanate, and N-butyl acetate in different proportions to form three different kinds of compositions. In this process, the light reflective powders are titanium dioxide powders. The light reflective powder of sample 3 is processed with a surface treatment by particle dispersants, such as cationic particle dispersants, anionic dispersant particle dispersants, or nonionic dispersant particle dispersants, or a combination thereof.

S3: respectively testing the light reflecting efficiency of the base 10 having the light reflective film 20 formed by three different kinds of compositions, and respectively testing the adhesion of the light reflective film 20 formed by three different kinds of compositions. In this embodiment, the adhesion of the light reflective film 20 is tested by an adhesion cross-cut test way, and the levels of the tested results ranges from lower class ISO 0 to higher class ISO 5, the lower the level, the better the adhesion of the light reflective film 20.

TABLE 1 shows light reflecting efficiency comparison between the base 10 and the base 10 having the light reflective film 20 formed by three different kinds of compositions and the adhesion of the light reflective film 20 formed by three different kinds of compositions.

TABLE 1 thickness of the base: 0.2 mm, light reflecting efficiency: 97.68%
thickness of the light reflective film: 0.2 mm

| M | A | B | C | adhesion level |
|---|---|---|---|---|
| 30%:50%:20% | 82.15% | 88.70% | 90.00% | ISO0 |
| 22%:50%:28% | 83.00% | 95.10% | 95.00% | ISO0 |
| 20%:50%:30% | 94.30% | 96.80% | 97.30% | ISO0 |
| 15%:50%:35% | 98.30% | 97.65% | 98.30% | ISO0 |

In table 1, M represents mass ration among the polyester polyols and isocyanate, the N-butyl acetate, and the light reflective powders; A represents light reflecting efficiency of the base 10 having the light reflective film 20 containing light reflective powders of sample 1, B represents light reflecting efficiency of the base 10 having the light reflective film 20 containing light reflective powders of sample 2, C represents light reflecting efficiency of the base 10 having the light reflective film 20 containing light reflective powders of sample 3.

As seen from the table 1, when the mass of the polyester polyols and isocyanate is 15%-30% of the total mass of the composition, the mass of the N-butyl acetate is 50% of the total mass of the composition, the mass of the light reflective powders is 20%-35% of the total mass of the composition, the light reflective film 20 has a good adhesion, and is easy to be fixed on the smooth reflective surface of the base 10 in a predetermined position and requirement.

In addition, with the mass ration of the light reflective powders increasing, the light reflecting efficiency of the light reflective film 20 increases as well.

According to sample 1 (particle size is 0.2 um) and sample 2 (particle size 0.3 um), when the M is 20%-30%: 50%:20%-30%, in a same mass ration of the light reflective powders, light reflecting efficiency of the base 10 having light reflective film 20 containing light reflective powders of sample 2 is higher than light reflecting efficiency of the base 10 having light reflective film 20 containing light reflective powders of sample 1.

When M is 15%: 50%: 35%, light reflecting efficiency (98.30%) of the base 10 having light reflective film 20 containing light reflective powders of sample 1 is higher than light reflecting efficiency (97.65%) of the base 10 having light reflective film 20 containing light reflective powders of sample 2, and is higher than light reflecting efficiency of the base 10 (97.68%).

According to sample 1 (particle size is 0.2 um) and sample 3 (particle size is 0.2 um), when M is 15%: 50%:35%, light reflecting efficiency (98.3%) of the base 10 having light reflective film 20 containing sample 3 is higher than that (97.68%) of the base 10, and equals that (98.3%) of the base 10 having light reflective film 20 containing sample 1.

According to the light reflective film 20 formed on the base 10, because the light reflective film 20 is a composition consisting of polyester polyols, isocyanate, N-butyl acetate and light reflective powders, and a mass ration among the polyester polyols and isocyanate, the N-butyl acetate, and the light reflective powders is 15%-30%: 50%: 20%-35%, the light reflective film 20 can be easily formed on the reflective surface of the base 10 in a predetermined position and requirements. In addition, because the light reflective film 20 is painted on the smooth reflective surface of the base 10, the light reflective film 20 can be fixed on the base 10 more firmly.

It is to be understood that the above-described embodiments are intended to illustrate rather than limit the disclosure. Variations may be made to the embodiments without departing from the spirit of the disclosure as claimed. The above-described embodiments illustrate the scope of the disclosure but do not restrict the scope of the disclosure.

What is claimed is:

1. A light reflective film painted on a reflective surface of a base, the light reflective film comprising a composition consisting of polyester polyols, an isocyanate, N-butyl acetate and light reflective powders, and a mass of the polyester polyols and isocyanate being 15%-30% of the total mass of the composition, a mass of the N-butyl acetate being 50% of the total mass of the composition, a mass of the light reflective powders being 20%-35% of the total mass of the composition.

2. The light reflective film of claim 1, wherein a thickness of the light reflective film is 0.2 mm.

3. The light reflective film of claim 1, wherein the mass of the polyester polyols and isocyanate is 15% of the total mass of the composition, the mass of the N-butyl acetate is 50% of the total mass of the composition, and the mass of the light reflective powders is 35% of the total mass of the composition.

4. The light reflective film of claim 1, wherein a particle size of the light reflective powders is 0.2 um or 0.3 um.

5. The light reflective film of claim 4, wherein the light reflective powders are barium sulfate powders or titanium dioxide powders.

6. The light reflective film of claim 1, wherein the base is a copper base, an aluminum base or an iron base.

7. A method for manufacturing a light reflective film, comprising:
providing polyester polyols, isocyanate, N-butyl acetate, and light reflective powders, and mixing the polyester polyols, the isocyanate, the N-butyl acetate, and the light reflective powders in a proportion to form a composition, a mass of the polyester polyols and isocyanate being 15%-30% of the total mass of the composition, a mass of the N-butyl acetate being 50% of the total mass of the composition, a mass of the light reflective powders being 20%-35% of the total mass of the composition;
providing a base and uniformly painting the composition to cover a smooth light reflective surface of the base;
heating the composition to harden and form the light reflective film on the light reflective surface of the base.

8. The method of claim 7, wherein the light reflective powders are processed with a surface treatment before mixing with the polyester polyols, the isocyanate, and the N-butyl acetate.

9. The method of claim 7, wherein a thickness of the light reflective film is 0.2 mm.

10. The method of claim 7, wherein the mass of the polyester polyols and isocyanate is 15% of the total mass of the composition, the mass of the N-butyl acetate is 50% of the total mass of the composition, and the mass of the light reflective powders is 35% of the total mass of the composition.

11. The method of claim 7, wherein a particle size of the light reflective powders is 0.2 um or 0.3 um.

12. The method of claim 7, wherein the light reflective powders are barium sulfate powders or titanium dioxide powders.

13. The method of claim 7, wherein the base is a copper base, an aluminum base or an iron base.

* * * * *